United States Patent
Sethuraman et al.

(10) Patent No.: US 6,526,097 B1
(45) Date of Patent: Feb. 25, 2003

(54) FRAME-LEVEL RATE CONTROL FOR PLUG-IN VIDEO CODECS

(75) Inventors: Sriram Sethuraman, Hightstown; Ravi Krishnamurthy, Princeton, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/388,653

(22) Filed: Sep. 2, 1999

Related U.S. Application Data

(60) Provisional application No. 60/118,359, filed on Feb. 3, 1999.

(51) Int. Cl.[7] .............................................. H04N 7/12
(52) U.S. Cl. ................... 375/240.2; 348/207; 348/699
(58) Field of Search ................... 375/240.04, 240.05, 375/240.1, 240.2, 240.14; 348/699, 700, 207, 222, 394.1, 695.1, 397.1, 419.1, 404.1; 382/232, 236, 238, 239; H04N 7/12

(56) References Cited

U.S. PATENT DOCUMENTS

| 5,333,012 A | | 7/1994 | Singhal et al. | |
|---|---|---|---|---|
| 5,416,521 A | | 5/1995 | Chujoh et al. | |
| 5,426,463 A | * | 6/1995 | Reininger et al. | 375/240.03 |
| 5,543,844 A | * | 8/1996 | Mita et al. | 375/240.2 |
| 5,583,573 A | * | 12/1996 | Asamura et al. | 375/240.04 |
| 5,675,385 A | * | 10/1997 | Sugiyama | 375/240.2 |
| 5,852,669 A | | 12/1998 | Eleftheriadis et al. | |
| 6,011,589 A | * | 1/2000 | Matsuura et al. | 348/699 |
| 6,018,362 A | * | 1/2000 | Suzuki et al. | 348/207 |

FOREIGN PATENT DOCUMENTS

| EP | 0 836 329 A1 | 4/1998 |
|---|---|---|
| WO | WO 98/37701 | 8/1998 |
| WO | WO 00/18137 | 3/2000 |

OTHER PUBLICATIONS

International Search Report for PCT/US00/02800, filed Mar. 2, 2000.

Vetra A. et al.; "Joint shape and texture rate control for MPEG-4 encoders", ISACS '98 Proceedings of the 1998 IEEE International Symposium on Circuits and Systems, vol. 5, May 31, 1998—Jun. 3, 1998, pp. 285–288.

* cited by examiner

Primary Examiner—Howard Britton
Assistant Examiner—Nhon T Diep
(74) Attorney, Agent, or Firm—William J. Burke

(57) ABSTRACT

A variety of different types of video frame encoders can be configured with, e.g., a multimedia processing subsystem, as long as the video frame encoder conforms to the interface protocol of the subsystem. A video controller in the subsystem performs the higher-level functions of coordinating the encoding of the video stream, thereby allowing the video frame encoder to limit its processing to the lower, frame level. In particular, the video controller provides information needed by the video frame encoder to encode the current frame in the video sequence. In addition to the raw image data, this information includes the type of frame to be encoded (e.g., an I or P frame), the currently available bandwidth for encoding the current frame, the time since the previous encoded frame, the desired frame rate, and a quality measure that may be used to trade off spatial and temporal qualities. The video frame encoder either encodes the frame as requested or indicates to the video controller that the frame should be skipped or otherwise not encoded as requested. The video controller can then respond appropriately, e.g., by requesting the video frame encoder to encode the next frame in the video sequence.

27 Claims, 6 Drawing Sheets

```
1   int rcInitGOP (int bitrate, int Quality, int skip_time_in_ms, int prev_bitCount,
      int first_frame_in_sequence)
2   {
3       int QPI, freeze_time;
4       prev_bitrate = bitrate;
5       if (first_frame_in_sequence) {   /* prev_I_frame_bits and QPIprev are not
          available, */
6           /* Modify the freeze time based on quality. */
7           freeze_time = MAX_FREEZE_TIME* (1.0 + ((float) (Quality-50))
              /I_SENSITIVITY);
8           target_bits = (freeze_time*bitrate) /1000;
9           /* Set QPI modified by quality. */
10          QPI = (int) QP_DEFAULT*(1.0 - ((float) (Quality-50)) /I_SENSITIVITY);
11      }
12      else{
13          /* Compute slack in buffer at start of new GOP. */
14          Rslack += prev_bitCount - (prev_bitrate*skip_time_in_ms) /1000;
15          /* In slack calculations, the instantaneous bit rate at the previous encoded
              frame is held */
16          /* until the current encoded frame. */
17
18          /* If slack is to large, do not encode this frame. */
19          /* Next frame is encoded as key frame, if buffer constraints allow. */
20          if (Rslack > (bitrate* (MAX_BUFDELAY_CONST*P_frame_time))
              /1000) return -1;
21
22          /* Find a QP for the I-frame, based on freeze time and user selected
              quality. */
23          /* Modify freeze time according to user selected quality. */
24          freeze_time = MAX_FREEZE_TIME* (1.0 + ((float) (Quality-50))
              /I_SENSITIVITY);
25
26          /* Compute target bits for the modified freeze time. */
27          target_bits = (freeze_time*bitrate) /1000;
28
29          /* Based on last I-frame's QP and bitcount, obtain QP for current I-frame. */
30          QPI = (prev_I_frame_bits*QPIprev) /target_bits;
31      }
32      /* Clip QPI to [1,31] for the common standards. */
33      QPI = (QPI > 31)?31: ((QPI < 1)?1:QPI);
34      return QPI;
35  }
```

FIG. 2

```
1  int rcFrameSkip (int bitrate, int skip_time_in_ms, int prev_bitCount)
2  {
3       Rslack += prev_bitCount - (prev_bitrate*skip_time_in_ms) /1000;
4
5       /* In slack calculations, the instantaneous bit rate at the previous
         encoded frame is held */
6       /* until the current encoded frame. */
7
8       /* Under allocation slack cannot grow beyond R_WINDOW worth of bits */
9       if (Rslack < - (R_WINDOW*bitrate) /1000) Rslack = - (R_WINDOW*bitrate)
         /1000;
10
11      prev_bitrate = bitrate;
12
13      /* Update P_frame_time which is the average time taken to code a P-frame. */
14      if (not I_frame)
15              P_frame_time = (P_frame_time*3 + skip_time_in_ms) >>2;
16      if (Rslack > (bitrate*(MAX_BUFDELAY_CONST*P_frame_time)) /1000)
                return 1;
17      else return 0;
18 }
```

*FIG. 4*

```
1  int rcGetTarget (int Quality, int bitrate, int MIN_BITS_REQUIRED_FOR_CODING)
2  {
3      float frame_rate, target_frame_rate;
4      prev_bitrate = bitrate;
5      frame_rate = 1000.0/P_frame_time;  /* Execution-constrained frame rate. */
6      target_frame_rate = def_frame_rate*(1.0 - (Quality-50) /P_SENSITIVITY);
       /* Quality-constrained frame rate. */
7
8      /* Quality based frame_rate is possible only if execution frame rate allows it. */
9      if (target_frame_rate > frame_rate) target_frame_rate = frame_rate;
10     target_bits = (bitrate/target_frame_rate) - ((Rslack*P_frame_time) /
       (R_WINDOW));
11
12     /* If target bits are too low, skip the frame. */
13     if (target_bits < MIN_BITS_REQUIRED_FOR_CODING) return -1;
14     else return target_bits;
15 }
```

*FIG. 6*

FRAME-LEVEL RATE CONTROL FOR PLUG-IN VIDEO CODECS

CROSS-REFERENCE TO RELATED APPLICATIONS

This application claims the benefit of the filing date of U.S. provisional application No. 60/118,359, filed on Feb. 3, 1999.

BACKGROUND OF THE INVENTION

1. Field of the Invention

The present invention relates to image processing, and, in particular, to video compression.

2. Description of the Related Art

The goal of video compression processing is to encode image data to reduce the number of bits used to represent a sequence of video images while maintaining an acceptable level of quality in the decoded video sequence. This goal is particularly important in certain applications, such as videophone or video conferencing over POTS (plain old telephone service) or ISDN (integrated services digital network) lines, where the existence of limited transmission bandwidth requires careful control over the bit rate, that is, the number of bits used to encode each image in the video sequence. Furthermore, in order to satisfy the transmission and other processing requirements of a video conferencing system, it is often desirable to have a relatively steady flow of bits in the encoded video bitstream. That is, the variations in bit rate from image to image within a video sequence should be kept as low as practicable.

Achieving a relatively uniform bit rate can be very difficult, especially for video compression algorithms that encode different images within a video sequence using different compression techniques. Depending on the video compression algorithm, images may be designated as the following different types of frames for compression processing:

- An intra (I) frame which is encoded using only intra-frame compression techniques,
- A predicted (P) frame which is encoded using inter-frame compression techniques based on a previous I or P frame, and which can itself be used as a reference frame to encode one or more other frames,
- A bi-directional (B) frame which is encoded using bi-directional inter-frame compression techniques based on a previous I or P frame, a subsequent I or P frame, or a combination of both, and which cannot itself be used to encode another frame, and
- A PB frame which corresponds to two images—a P frame and a subsequent B frame that are encoded as a single frame (as in the H.263 video compression algorithm). Depending on the actual image data to be encoded, these different types of frames typically require different numbers of bits to encode. For example, I frames typically require the greatest number of bits, while B frames typically require the least number of bits.

In a typical transform-based video compression algorithm, a block-based transform, such as a discrete cosine transform (DCT), is applied to blocks of image data corresponding either to pixel values or pixel differences generated, for example, based on a motion-compensated inter-frame differencing scheme. The resulting transform coefficients for each block are then quantized for subsequent encoding (e.g., run-length encoding followed by variable-length encoding). The degree to which the transform coefficients are quantized directly affects both the number of bits used to represent the image data and the quality of the resulting decoded image. This degree of quantization is also referred to as the quantization level, which is often represented by a specified quantizer value that is used to quantize all of the transform coefficients. In some video compression algorithms, the quantization level refers to a particular table of quantizer values that are used to quantize the different transform coefficients, where each transform coefficient has its own corresponding quantizer value in the table. In general, higher quantizer values imply more severe quantization and therefore fewer bits in the encoded bitstream at the cost of lower playback quality of the decoded images. As such, the quantizer is often used as the primary variable for controlling the tradeoff between bit rate and image quality.

At times, using quantization level alone may be insufficient to meet the bandwidth and quality requirements of a particular application. In such circumstances, it may become necessary to employ more drastic techniques, such as frame skipping, in which one or more frames are dropped from the video sequence. Such frame skipping may be used to sacrifice short-term temporal quality in the decoded video stream in order to maintain a longer-term spatial quality at an acceptable level.

SUMMARY OF THE INVENTION

The present invention is directed to video encoding techniques that separate the functionality for controlling the higher-level (i.e., sequence-level) aspects of encoding video data from the functionality for implementing the lower-level (i.e., frame-level) encoding of individual video frames within the video sequence. The techniques of the present invention enable video processing systems to be built modularly, where a video processing subsystem that controls the sequence-level processing can be configured with any of a variety of plug-in video encoders that control the frame-level processing that conform to the interface protocol of the subsystem. This enables the selection of video encoder to be dependent on the particular application. For example, more expensive, higher-quality video encoders can be employed for higher-quality applications, while less expensive, lower-quality video encoders can be employed for lower-quality applications.

The present invention allows control parameters such as bit rate, desired spatio-temporal quality, and key-frame requests to be set at any or every frame over a video sequence, thus allowing the encoding to be tailored dynamically to network conditions, user preferences, and random access/re-synchronization requirements.

In one embodiment, the present invention is a method for encoding a video sequence by a video encoder, comprising the steps of (a) receiving a current frame of video data; (b) receiving a set of input parameter values corresponding to the current frame; (c) determining whether to skip the current frame based on the set of input parameter values; (d) if appropriate, encoding the current frame based on the set of input parameter values; and (e) repeating steps (a)–(d) for one or more other frames in the video sequence, wherein one or more of the input parameter values varies from frame to frame in the video sequence.

BRIEF DESCRIPTION OF THE DRAWINGS

Other aspects, features, and advantages of the present invention will become more fully apparent from the following detailed description, the appended claims, and the accompanying drawings in which:

FIG. 2 provides pseudocode for the function rcInitGOP;

FIG. 4 provides pseudocode for the function rcFrameSkip;

FIG. 6 provides pseudocode for the function rcGetTarget; and

DETAILED DESCRIPTION

Figure 1:
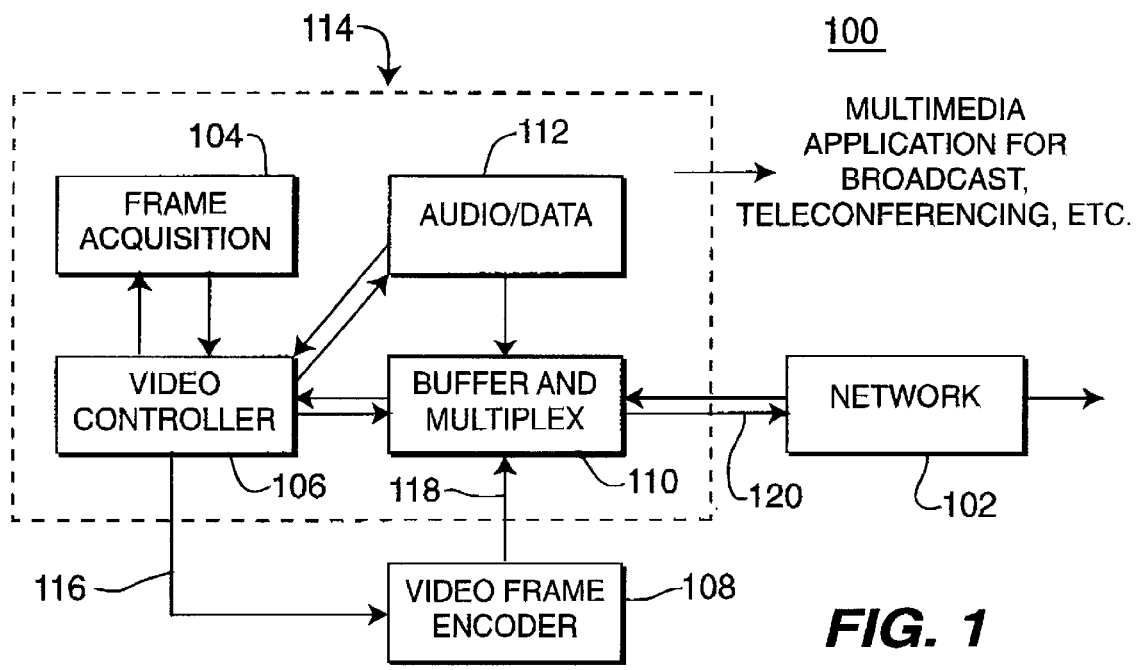
FIG. 1 shows a multimedia processing system, according to one embodiment of the present invention.

FIG. 1 shows a multimedia processing system 100, according to one embodiment of the present invention. System 100 encodes sequences of video images and optionally combines the resulting compressed video bitstream with audio and/or data streams for transmission over a network 102. System 100 may be used for multimedia applications such as broadcasting or teleconferencing.

In particular, frame acquisition module 104 (e.g., a video camera) provides a sequence of video images to video controller 106, which passes the frames to video frame encoder 108, which performs the actual encoding of the video data. The resulting encoded video bitstream 118 is transmitted by encoder 108 to buffer and multiplex module 110, which may combine the encoded video bitstream with one or more audio and/or data streams provided by audio/data module 112 to form a multimedia stream 120, which is then transmitted over network 102 to one or more remote client receivers (not shown) that decode the multimedia stream for playback.

In system 100, video controller 106 controls the operations of all of the other modules in system 100. In particular, video controller 106 controls the operations of frame acquisition module 104, buffer and multiplex module 110, and audio/data module 112. Video controller 106 also does all the multiplexing and handshaking with the remote clients. As a result, encoder 108 can be implemented independent of video controller 106, with an agreed-upon interface 116 between the controller and the encoder.

In general, the video controller need not control all modules in the system. System 100 is provided to show an example of the separation of a system-level application from the plug-in video codec. Other system configurations are possible. For example, audio can have its own controller. The arrows from video controller 106 are shown mainly to indicate the communication needed to ensure proper synchronization of video with audio and data.

The independent implementation of video frame encoder 108 is indicated in FIG. 1 by depicting encoder 108 outside of a multimedia processing subsystem 114 that contains video controller 106 and the other modules 104, 110, and 112. As long as a video frame encoder conforms to the protocol of interface 116, it can be configured with subsystem 114 to form a multimedia processing system similar to that shown in FIG. 1. This modularity enables subsystem 114 to be configured with different video frame encoders, depending on the particular application. For lower quality applications, subsystem 114 can be configured with lower quality, less expensive video frame encoders. Similarly, for higher quality applications, subsystem 114 can be configured with higher quality, more expensive video frame encoders. Moreover, as technology improves and better video frame encoders become available, a multimedia processing system can be upgraded by reconfiguring subsystem 114 with a newer, better video frame encoder. Of course, in each configuration, a matched video frame decoder is used at each client end of the network.

In general, in order for video frame encoder 108 to operate as independent module, video controller 106 provides video frame encoder 108 all of the information needed to compress a sequence of video frames into an encoded video bitstream. This information includes certain parameters used by encoder 108 to control the video compression processing as well as the raw video data itself.

The present invention addresses the problem of frame-level rate control at video frame encoder 108. The rate control algorithm of the present invention, implemented at the encoder, reacts to the video controller's demands. In addition, the rate control algorithm proactively allocates bandwidth based on scene content and "slack," where "slack" is the state of a virtual buffer that is maintained at the video frame encoder. The rate of depletion of this virtual buffer is calculated from the parameters sent from the video controller.

The rate control algorithm of the present invention takes much of the responsibility of frame-level rate control from the video controller and moves it to the frame encoder. This is a very desirable property since it enables the encoder to proactively allocate bits based on scene content, instead of just reacting to the controller parameters. Also, very little rate control has to be performed by the controller. However, due to fluctuations in the video data being encoded, it may sometimes be necessary for the controller to perform simple corrections, like skipping a frame.

In preferred embodiments, the video controller passes most or all of the following information to the video frame encoder when asking for the encoding of a frame:

bitrate: The instantaneous available bandwidth (bit rate) which the encoder is expected to derive. The value of bitrate may be based on feedback received by controller 106 from buffer nodule 110 and network 102.

I_frame: Flag indicating whether or not the current frame is a key frame (i.e., an intra-coded picture).

Quality: Degree of spatial vs. temporal quality that the controller desires. The value of Quality, which can change from frame to frame, can range from 0 to 100, where 0 corresponds to maximal temporal quality and 100 corresponds to maximal spatial quality. Maximal temporal quality means that a uniform frame rate is preserved even if severe quantization is needed to achieve target bit rates. Maximal spatial quality means that frames can be freely dropped if appropriate to maintain a specified degree of spatial quality within the coded frames. In between these two extremes, the Quality value corresponds to monotonically decreasing temporal resolution and corresponding spatial qualities that are content dependent.

skip_time_in_ms: Time from previous encoded frame, which indicates number of frames skipped from previous encoded frame.

target_frame_rate: Desired frame rate at which the controller wants the encoder to operate.

Additional parameters relating to buffer state (like fullness) may also be passed, for finer control. Also, during an initialization phase, the following static parameters are passed:

Frame size (i.e., width and height);

Input format; and

Periodicity of key frames (e.g., after every 50 coded frames, there will be an I-frame). This is not required for the case where frames passed by the controller can be skipped by the encoder.

The following discussion assumes only I and P frames with variables defined as follows:

def_frame_rate: Default frame rate.

first_frame_in_sequence: Flag indicating whether the current I frame is the first frame in the video sequence. If so, then certain parameter values (e.g., prev_bitrate, prev_bitCount, prev_I_frame_bits, and QPIprev) will not be available.

frame_rate: Number of frames per second.

freeze_time: Current time that is available for I-frame transmission.

I_SENSITIVITY: Controls how the Quality parameter affects the QP for I frames.

MAX_BUFDELAY_CONST: Maximum buffer delay that can be tolerated based on overall system delay requirements. This value can be expressed as a constant times P_frame_time.

MAX_FREEZE_TIME: Maximum time that is available for I-frame transmission. During this time, the previous frame will be held in the decoder-side display buffer. It is desirable to keep this freeze time within certain bounds (e.g., 300 ms).

MIN_BITS_REQUIRED_FOR_CODING: Minimum number of bits required for coding the current frame.

P_frame_time: Average time duration between P frames at a given time. This value could vary depending on the current load on the encoder, the particular algorithm being used, and the capture delays.

prev_bitCount: Number of bits actually used to encode the previous frame (whether I or P).

prev_bitrate: Target number of bits for encoding the previous frame (whether I or P).

prev_I_frame_bits: Number of bits used to encode the previous I frame.

P_SENSITIVITY: Controls how the Quality parameter affects the QP for P frames.

QP_DEFAULT: Default value for the quantizer parameter QP that is used for an I frame when no information is available.

QPI: Quantizer parameter for current I frame.

QPIprev: Quantizer parameter for previous I frame.

Rslack: Number of bits left in the encoder virtual buffer.

R_WINDOW: The time window over which slack can be accumulated and distributed. R_WINDOW is related to buffer size. For low-delay applications, R_WINDOW is very small. For streaming or broadcast applications, R_WINDOW can be large.

target_bits: Target number of bits for encoding the current frame.

Using these terms, the following rate control algorithm is implemented, which constantly reacts to the changing parameters supplied by the controller.

Rate Control for a Key Frame

At a key frame (i.e., an I frame at the beginning of a group of pictures (GOP)), the video controller calls a function rcInitGOP into the video frame encoder to calculate the target bit rate (target_bits) and set the initial value for the quantizer parameter QPI for the I frame. The function rcInitGOP receives the following input parameters: bitrate, Quality, skip_time_in_ms, prev_bitCount, and first_frame_in_sequence. Pseudocode for the function rcInitGOP is given in FIG. 2.

Figure 3:
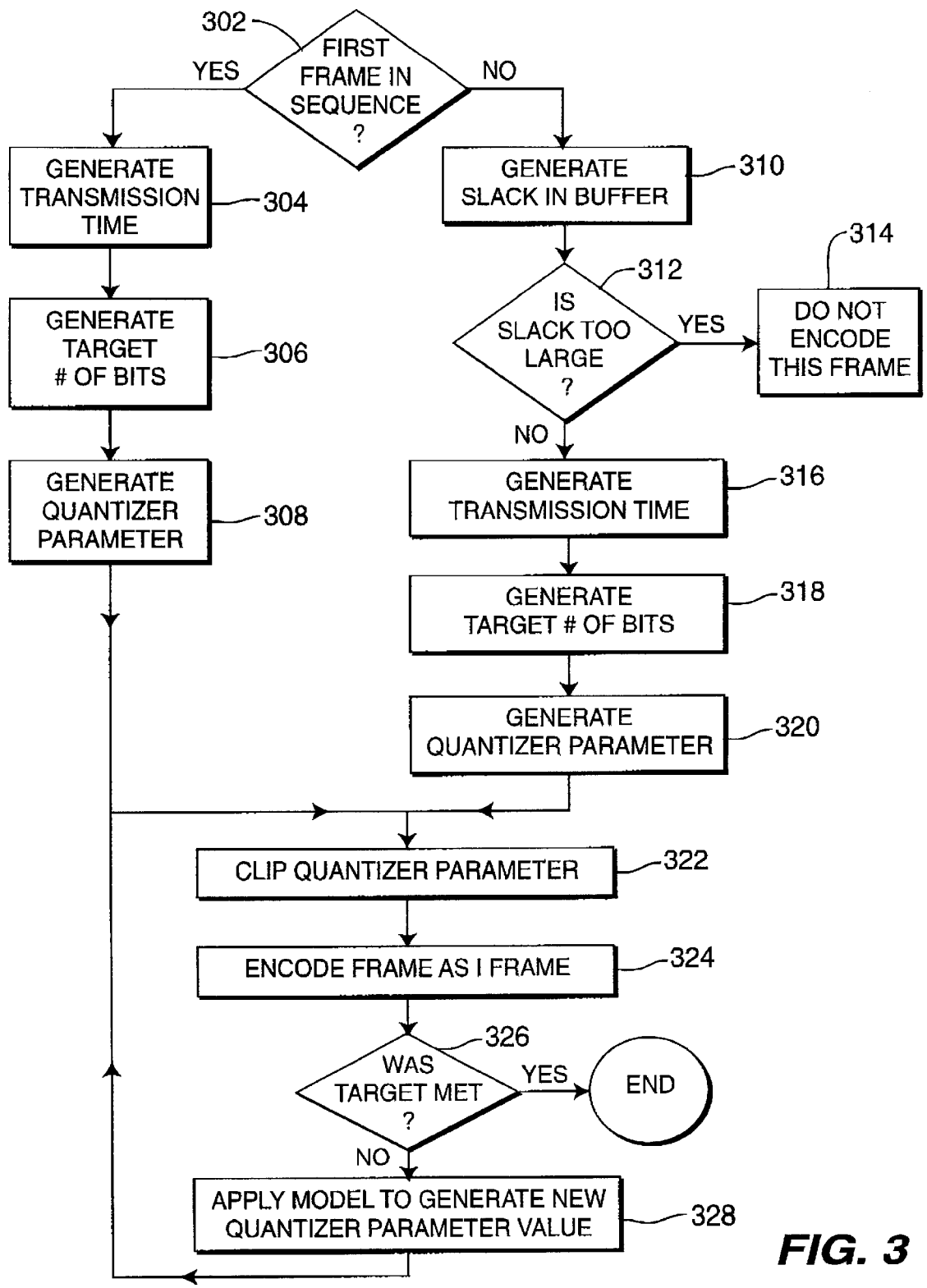
FIG. 3 shows a flow diagram of the processing performed by the function rcInitGOP of FIG. 2.

FIG. 3 shows a flow diagram of the processing performed by the function rcInitGOP of FIG. 2. If the current I frame is the first frame in the video sequence (step 302 and line 5 of FIG. 2), then there are no values for certain parameters related to previous frames and special processing is implemented. In particular, the time available for transmission of this I frame (freeze_time) is generated based on the maximum freeze time (MAX_FREEZE_TIME) and the quality parameters (Quality and I_SENSITIVITY) (step 304 and line 7). This current freeze time is then used to generate the target for the current frame (target_bits) (step 306 and line 8) and the quantizer parameter for the current I frame (QPI) is generated from the default quantizer parameter value (QP_DEFAULT) and the quality parameters (Quality and I_SENSITIVITY) (step 308 and line 10)

When the current I frame is not the first frame in the video sequence, the slack in the buffer (Rslack) at the start of the new GOP is generated (step 310 and line 14). If the buffer slack is too large (step 312 and line 20), then the current frame is not encoded as an I frame (step 314 and line 20). In this case, the video controller is informed by the video frame encoder that the current frame was not encoded as an I frame, and the video controller will respond with some appropriate action (e.g., request the video frame encoder to encode the next frame as an I frame).

If the buffer slack is not too large, then the time available for transmission of this I frame (freeze_time) is generated based on the maximum freeze time (MAX_FREEZE_TIME) and the quality parameters (Quality and I_SENSITIVITY) (step 316 and line 24). This current freeze time is then used to generate the target for the current frame (target_bits) (step 318 and line 27) and the quantizer parameter for the current I frame (QPI) is generated from the previous quantizer parameter value (QPIprev), the number of bits used to encode the previous I frame (prev_I_frame_bits) and the current target (target_bits) (step 320 and line 30).

Whether or not the current I frame is the first frame in the sequence, the quantizer parameter for the current frame (QPI) is clipped to the allowable range (e.g., 1 to 31) (step 322 and line 33).

The rest of the processing shown in FIG. 3 occurs after the function rcInitGOP has completed. The value for QPI returned from the function rcInitGOP is used first to encode the I frame with no quantizer adaptation over the I frame (step 324). If the number of bits actually used to encode the I frame sufficiently match the target (i.e., target_bits) computed in by the function rcInitGOP (i.e., to within a specified tolerance) (step 326), then processing of the I frame is complete. If, on the other hand, the actual number of bits does not sufficiently match the target bit rate, then the value of QPI is recalculated using a linear model (step 328) based on the following formula:

$$QPI(\text{new}) = (QPI(\text{old}) * \text{actual\_bits\_with\_}QPI(\text{old}))/\text{target\_bits}$$

and the I frame is re-encoded using the new QPI value QPI_new (steps 322 and 324). This recalculation of QPI and re-encoding of the I frame may be repeated one or more times until the target bit rate is achieved (or until the linear model generates a value for QPI that has already been used (not shown in FIG. 3)).

Rate Control for a P frame

For P frames, the video controller calls a function rcFrameSkip into the video frame encoder to decide whether or not to skip the current frame based on the current bit rate (bitrate), the time between the previous encoded frame and the current frame (skip_time_in_ms), and tile actual number of bits used to encode the previous frame (prev_bitCount). Pseudocode for the function rcFrameSkip is given in FIG. 4.

Figure 5:
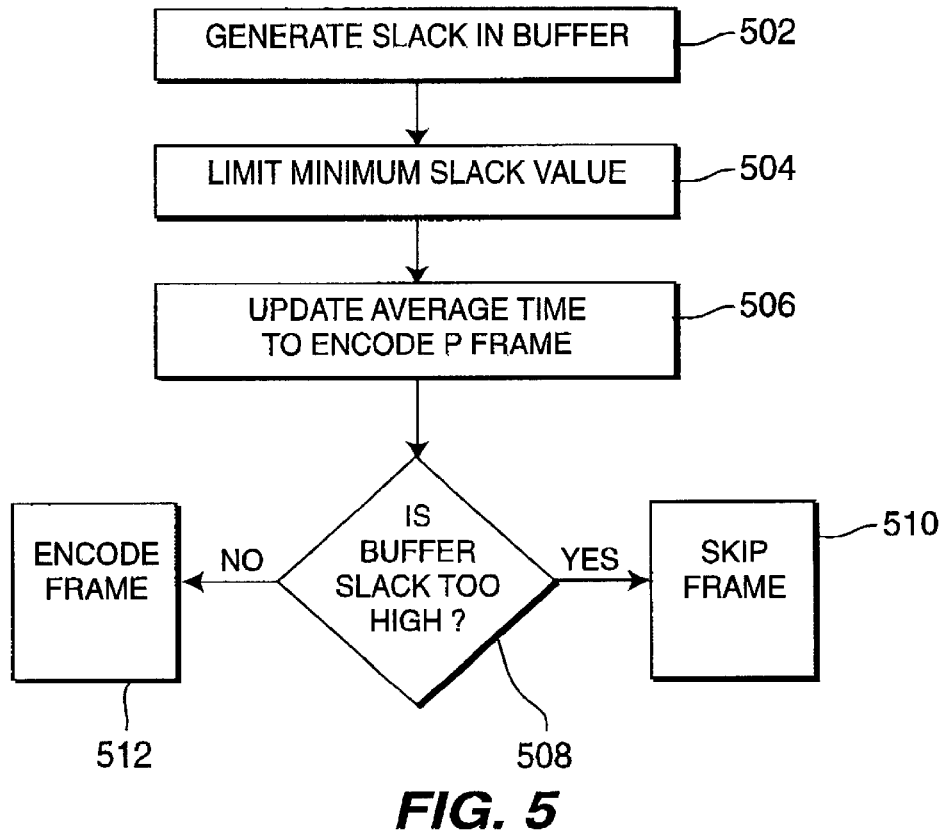
FIG. 5 shows a flow diagram of the processing performed by the function rcFrameSkip of FIG. 4.

FIG. 5 shows a flow diagram of the processing performed by the function rcFrameSkip of FIG. 4. The current slack in the buffer (Rslack) is generated (step 502 and line 3 of FIG. 4), and then clipped if it is too low (step 504 and line 9). An average time used to encode a P frame is then updated (step 506 and line 15). The update weights the current frame more than the past history, to reflect changing dynamics of processor performance and buffer status. If the buffer slack is too large (step 508 and line 16), then the current frame is to be skipped (i.e., not encoded) (step 510 and line 16). The video controller is informed by the video frame encoder that the current frame is to be skipped, and the video controller will respond with some appropriate action (e.g., request the video frame encoder to encode a subsequent frame (e.g., the next frame) as a P or I frame, depending on the location of the current frame in the GOP). Otherwise, the current frame is to be encoded as a P frame (step 512 and line 17).

If the function rcFrameSkip indicates that the current frame is to be encoded as a P frame, then the video controller calls a function rcGetTarget into the video frame encoder to generate the target number of bits used to encode the current P frame, based on the quality parameter (Quality), the current bit rate (bitrate), and the minimum number of bits to be used to encode this frame (MIN_BITS_REQUIRED_FOR_CODING). Pseudocode for the function rcGetTarget is given in FIG. 6.

Figure 7:
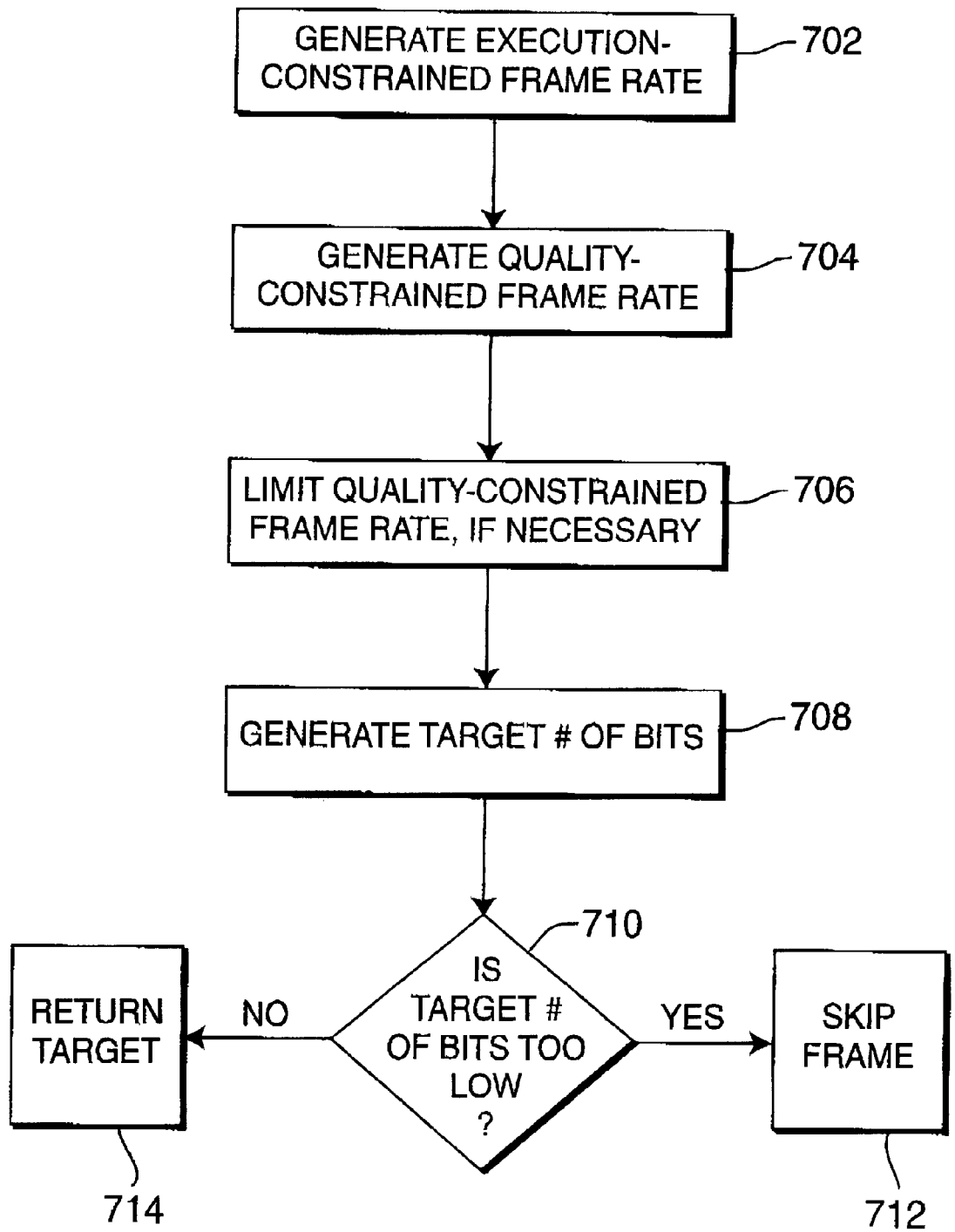
FIG. 7 shows a flow diagram of the processing performed by the function rcGetTarget of FIG. 6.

FIG. 7 shows a flow diagram of the processing performed by the function rcGetTarget of FIG. 6. An execution-constrained frame rate (frame_rate) is generated (step 702 and line 5 of FIG. 6), and a quality-constrained frame rate (target_frame_rate) is generated (step 704 and line 6). If the quality-constrained frame rate is greater than the execution-constrained frame rate, then the quality-constrained frame rate is limited to the execution-constrained frame rate (step 706 and line 9).

The target number of bits to encode the current frame is then generated (step 708 and line 10), based on the quality-constrained frame rate (target_frame_rate) and the current buffer state (Rslack). If the target number of bits is too small (step 710 and line 13), then the current frame is to be skipped (step 712 and line 13). The video controller is informed by the video frame encoder that the current frame is to be skipped, and the video controller will respond with some appropriate action (e.g., request the video frame encoder to encode a subsequent frame (e.g., the next frame) as a P or I frame, depending on the location of the current frame in the GOP). Otherwise, the current frame is to be encoded as a P frame and the target number of bits is returned by the function rcGetTarget (step 714 and line 14).

After successfully generating a target number of bits to be used to encode the current P frame, the frame may be encoded using any suitable compression algorithm, including those in which the quantizer parameter is allowed to vary from macroblock to macroblock within each image. As in the case of I frames, depending on the application, each P frame may be encoded one or more times to ensure acceptable achievement of the target bit rate.

Variations

In addition to deciding to skip frames based on buffer state and/or minimum bits to encode, the decision as to whether to skip a frame may be made after motion estimation. For example, if the number of bits required to encode just the motion vectors themselves is close to the target, then the frame may be skipped.

In some applications, the exact buffer information may be available. In those cases, the calculations of Rslack can be replaced by using the exact buffer fullness values.

In the discussion above, the video frame encoder indicates to the video controller whether the current frame is to be skipped, and the video controller handles the actual skipping of frames (e.g., selecting the next frame to encode). In some applications, this functionality may not be supported, and the video frame encoder may be required to encode each frame provided by the video controller. One possibility is for the video frame encoder to encode the frame as a P frame with each and every macroblock designed as a skipped block. This will effectively achieve the same result of skipping the frame with only a relatively small amount of overhead data to be transmitted.

The frame-level rate control of the present invention is particularly applicable in real-time very-low-bit-rate coders. The algorithm can be implemented by coders using only P frames as well as coders using PB-frames, an added functionality when compared to the TMN8 test model for the H.263+ standard. The algorithm provides a buffer delay variable, which can be selected by a user to trade delay for graceful change in spatial quality over time. By adapting the target bit allocation for a frame to the scene content, spatial quality is maintained in high-motion areas and quick recovery is made possible after an abrupt motion, while maintaining the buffer delay within desired limits.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the alt without departing from the principle and scope of the invention as expressed in the following claims.

What is claimed is:

1. In a video processing system comprising a plug-in video encoder and a video controller distinct from the plug-in video encoder and capable of operating with a variety of different plug-in video encoders, a method for encoding a video sequence by the plug-in video encoder, comprising the steps of:

(a) receiving a current frame of video data;

(b) receiving a set of input parameter values corresponding to the current frame from the video controller, wherein the set of input parameter values is distinct from the current frame and was generated by the video controller prior to any encoding of the current frame by the plug-in video encoder;

(c) determining whether to skip the current frame based on the set of input parameter values;

(d) if appropriate, encoding the current frame based on the set of input parameter values; and (e) repeating steps (a)–(d) for one or more other frames in the video sequence, wherein one or more of the input parameter values vary from frame to frame in the video sequence.

2. The invention of claim 1, wherein step (d) comprises the steps of:

(1) generating a target bit count for the current frame;

(2) selecting one or more quantization parameter (QP) values for the current frame based on the target bit count; and (3) encoding the current frame based on the one or more QP values.

3. The invention of claim 2, wherein step (d) further comprises the steps of:

(4) determining whether an actual number of bits used to encode the current frame sufficiently matches the target bit count; and (5) if appropriate, adjusting at least one of the one or more QP values based on the actual number of bits and the target bit count and re-encoding the current frame based on the adjusted one or more QP values.

4. The invention of claim 1, wherein:

the set of input parameter values comprises a quality parameter used to trade off spatial quality versus temporal quality; and step (d) comprises the step of encoding the current frame based on the quality parameter.

5. The invention of claim 4, wherein step (d) comprises the steps of:

(1) generating a target bit count for the current frame based on the quality parameter; and (2) encoding the current frame based on the target bit count.

6. The invention of claim 5, wherein the target bit count is generated based on the quality parameter, a current bit rate value, and a buffer slack measure.

7. The invention of claim 5, wherein, when the current frame is an I frame:

$$freeze\_time = MAX\_FREEZE\_TIME * (1.0 + ((float)(Quality-50))/I\_SENSITIVITY)$$

and $$target\_bits = (freeze\_time * bitrate)/1000;$$

wherein:

freeze_time is a current time that is available for I-frame transmission;

MAX_FREEZE_TIME is a specified maximum time that is available for I-frame transmission;

Quality is the quality parameter;

I_SENSITIVITY is a sensitivity parameter for I frames;

target_bits is a target number of bits for encoding the current frame; and bitrate is the current bit rate value.

8. The invention of claim 5, wherein, when the current frame is a P frame:

$$target\_frame\_rate = def\_frame\_rate * (1.0 - (Quality-50)/P\_SENSITIVITY);$$

and $$target\_bits = (bitrate/target\_frame\_rate) - ((Rslack * P\_frame\_time)/(R\_WINDOW));$$

wherein:

target_frame rate is a specified desired frame rate for the video encoder;

def_frame_rate is a specified default frame rate for the video encoder;

Quality is the quality parameter;

P_SENSITIVITY is a sensitivity parameter for P frames; and target_bits is a target number of bits for encoding the current frame; and bitrate is the current bit rate value;

Rslack is a number of bits left in a virtual buffer of the video encoder;

P_frame_time is a current average time duration between P frames; and

R_WINDOW is a time window over which buffer slack can be accumulated and distributed.

9. The invention of claim 4, further comprising the step of disabling the quality parameter for P frame target allocation, when an instantaneous execution-constrained frame rate is less than a frame rate generated from the quality parameter.

10. The invention of claim 1, wherein:

the set of input parameter values comprises a time since a previous encoded frame; and step (c) comprises the step of determining whether to skip the current frame based on the time since the previous encoded frame.

11. The invention of claim 10, wherein step (c) comprises the steps of:

(1) updating a measure of buffer fullness based on the time since the previous encoded frame; and (2) determining whether to skip the current frame based on the measure of buffer fullness.

12. The invention of claim 10, further comprising the step of using the time since the previous encoded frame to generate an instantaneous execution-constrained frame rate.

13. The invention of claim 1, wherein:

the set of input parameter values comprises a current bit rate value; and step (d) comprises the step of encoding the current frame based on the current bit rate value to enable the video encoder to provide variable bit-rate encoding.

14. The invention of claim 1, wherein, when the current frame is an I frame, step (c) comprises the steps of determining whether to skip the current frame, in which case a next encoded frame is encoded as an I frame.

15. The invention of claim 1, wherein, when the current frame is a P frame, step (c) comprises the steps of determining whether to skip the current frame, in which case each macroblock in the current P frame is encoded as a skipped macroblock.

16. The invention of claim 1, wherein, when the current frame is a P frame, step (c) comprises the steps of determining whether to skip the current frame after performing motion estimation based on a number of bits required to encode motion vectors from the motion estimation.

17. A plug-in video encoder for encoding a video sequence in a video processing system further comprising a video controller distinct from the plug-in video encoder and capable of operating with a variety of different plug-in video encoders, the plug-in video encoder comprising:

(a) means for receiving a current frame of video data;

(b) means for receiving a set of input parameter values corresponding to the current frame from the video controller, wherein the set of input parameter values is distinct from the current frame and was generated by the video controller prior to any encoding of the current frame by the plug-in video encoder;

(c) means for determining whether to skip the current frame based on the set of input parameter values; and (d) means for encoding the current frame based on the set of input parameter values, wherein one or more of the input parameter values vary from frame to frame in the video sequence.

18. A machine-readable medium, having encoded thereon program code, wherein, when the program code is executed by a plug-in video encoder, the plug-in video encoder implements, in a video processing system comprising a plug-in video encoder and a video controller distinct from the plug-in video encoder and capable of operating with a variety of different plug-in video encoders, a method for encoding a video sequence, comprising the steps of:

(a) receiving a current frame of video data in a video sequence;

(b) receiving a set of input parameter values corresponding to the current frame from the video controller, wherein the set of input parameter values is distinct from the current frame and was generated by the video controller prior to any encoding of the current frame by the plug-in video encoder;

(c) determining whether to skip the current frame based on the set of input parameter values;

(d) if appropriate, encoding the current frame based on the set of input parameter values; and (e) repeating steps (a)–(d) for one or more other frames in the video sequence, wherein one or more of the input parameter values vary from frame to frame in the video sequence.

19. The invention of claim 1, wherein:

the set of input parameter values comprises:
 a quality parameter used to trade off spatial quality versus temporal quality;
 a time since a previous encoded frame; and
 a current bit rate value;

step (c) comprises the step of determining whether to skip the current frame based on the time since the previous encoded frame; and step (d) comprises the steps of
 (1) generating a target bit count for the current frame based on the quality parameter, the current bit rate value, and a buffer slack measure; and
 (2) encoding the current frame based on the target bit count.

20. The invention of claim 17, wherein:

the set of input parameter values comprises:
 a quality parameter used to trade off spatial quality versus temporal quality;
 a time since a previous encoded frame; and
 a current bit rate value;

step (c) comprises the step of determining whether to skip the current frame based on the time since the previous encoded frame; and step (d) comprises the steps of
 (1) generating a target bit count for the current frame based on the quality parameter, the current bit rate value, and a buffer slack measure; and
 (2) encoding the current frame based on the target bit count.

21. The invention of claim 18, wherein:

the set of input parameter values comprises:
 a quality parameter used to trade off spatial quality versus temporal quality;
 a time since a previous encoded frame; and
 a current bit rate value;

step (c) comprises the step of determining whether to skip the current frame based on the time since the previous encoded frame; and step (d) comprises the steps of
 (1) generating a target bit count for the current frame based on the quality parameter, the current bit rate value, and a buffer slack measure; and
 (2) encoding the current frame based on the target bit count.

22. A video processing system comprising:

(1) a plug-in video encoder; and (2) a video controller distinct from the plug-in video encoder and capable of operating with a variety of different plug-in video encoders, wherein the plug-in video encoder:

(a) receives a current frame of video data;

(b) receives a set of input parameter values corresponding to the current frame from the video controller, wherein the set of input parameter values is distinct from the current frame and was generated by the video controller prior to any encoding of the current frame by the plug-in video encoder;

(c) determines whether to skip the current frame based on the set of input parameter values;

(d) if appropriate, encodes the current frame based on the set of input parameter values; and (e) repeats steps (a)–(d) for one or more other frames in the video sequence, wherein one or more of the input parameter values vary from frame to frame in the video sequence.

23. The invention of claim 22, wherein:

the set of input parameter values comprises:
 a quality parameter used to trade off spatial quality versus temporal quality;
 a time since a previous encoded frame; and
 a current bit rate value;

step (c) comprises the step of determining whether to skip the current frame based on the time since the previous encoded frame; and step (d) comprises the steps of
 (1) generating a target bit count for the current frame based on the quality parameter, the current bit rate value, and a buffer slack measure; and
 (2) encoding the current frame based on the target bit count.

24. A method for encoding a video sequence by a video encoder, comprising the steps of:

(a) receiving a current frame of video data;

(b) receiving a set of input parameter values corresponding to the current frame;

(c) determining whether to skip the current frame based on the set of input parameter values;

(d) if appropriate, encoding the current frame based on the set of input parameter values; and (e) repeating steps (a)–(d) for one or more other frames in the video sequence, wherein one or more of the input parameter values vary from frame to frame in the video sequence, wherein:

the set of input parameter values comprises a quality parameter used to trade off spatial quality versus temporal quality;

step (d) comprises the steps of:
  (1) generating a target bit count for the current frame based on the quality parameter; and
  (2) encoding the current frame based on the target bit count; and when the current frame is an I frame:

$$\text{freeze\_time} = \text{MAX\_FREEZE\_TIME} * (1.0 + ((\text{float})(\text{Quality} - 50)) / \text{I\_SENSITIVITY})$$

and $$\text{target\_bits} = (\text{freeze\_time} * \text{bitrate}) / 1000;$$

wherein:

freeze_time is a current time that is available for I-frame transmission;

MAX_FREEZE_TIME is a specified maximum time that is available for I-frame transmission;

Quality is the quality parameter;

I_SENSITIVITY is a sensitivity parameter for I frames;

target_bits is a target number of bits for encoding the current frame; and bitrate is the current bit rate value.

25. A method for encoding a video sequence by a video encoder, comprising the steps of:
  (a) receiving a current frame of video data;
  (b) receiving a set of input parameter values corresponding to the current frame;
  (c) determining whether to skip the current frame based on the set of input parameter values;
  (d) if appropriate, encoding the current frame based on the set of input parameter values; and
  (e) repeating steps (a)–(d) for one or more other frames in the video sequence, wherein one or more of the input parameter values vary from frame to frame in the video sequence, wherein:

the set of input parameter values comprises a quality parameter used to trade off spatial quality versus temporal quality;

step (d) comprises the steps of:
  (1) generating a target bit count for the current frame based on the quality parameter; and
  (2) encoding the current frame based on the target bit count; and when the current frame is a P frame:

$$\text{target\_frame\_rate} = \text{def\_frame\_rate} * (1.0 - (\text{Quality} - 50) / \text{P\_SENSITIVITY});$$

and $$\text{target\_bits} = (\text{bitrate} / \text{target\_frame\_rate}) - ((\text{Rslack} * \text{P\_frame\_time}) / (\text{R\_WINDOW}));$$

wherein:

target_frame_rate is a specified desired frame rate for the video encoder;

def_frame_rate is a specified default frame rate for the video encoder;

Quality is the quality parameter;

P_SENSITIVITY is a sensitivity parameter for P frames; and target_bits is a target number of bits for encoding the current frame; and bitrate is the current bit rate value;

Rslack is a number of bits left in a virtual buffer of the video encoder;

P_frame_time is a current average time duration between P frames; and

R_WINDOW is a time window over which buffer slack can be accumulated and distributed.

26. A method for encoding a video sequence by a video encoder, comprising the steps of:
  (a) receiving a current frame of video data;
  (b) receiving a set of input parameter values corresponding to the current frame;
  (c) determining whether to skip the current frame based on the set of input parameter values;
  (d) if appropriate, encoding the current frame based on the set of input parameter values; and
  (e) repeating steps (a)–(d) for one or more other frames in the video sequence, wherein one or more of the input parameter values vary from frame to frame in the video sequence, wherein:

the set of input parameter values comprises a quality parameter used to trade off spatial quality versus temporal quality;

step (d) comprises the step of encoding the current frame based on the quality parameter; and further comprising the step of disabling the quality parameter for P frame target allocation, when an instantaneous execution-constrained frame rate is less than a frame rate generated from the quality parameter.

27. A method for encoding a video sequence by a video encoder, comprising the steps of:
  (a) receiving a current frame of video data;
  (b) receiving a set of input parameter values corresponding to the current frame;
  (c) determining whether to skip the current frame based on the set of input parameter values;
  (d) if appropriate, encoding the current frame based on the set of input parameter values; and
  (e) repeating steps (a)–(d) for one or more other frames in the video sequence, wherein one or more of the input parameter values vary from frame to frame in the video sequence, wherein:

the set of input parameter values comprises a time since a previous encoded frame;

step (c) comprises the step of determining whether to skip the current frame based on the time since the previous encoded frame; and further comprising the step of using the time since the previous encoded frame to generate an instantaneous execution-constrained frame rate.

* * * * *